United States Patent
Cai et al.

(10) Patent No.: US 11,735,913 B2
(45) Date of Patent: Aug. 22, 2023

(54) AUTONOMOUS REAL-TIME REMEDIAL ACTION SCHEME (RAS)

(71) Applicant: Schweitzer Engineering Laboratories, Inc., Pullman, WA (US)

(72) Inventors: Niannian Cai, Pullman, WA (US); Abdel Rahman Khatib, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 332 days.

(21) Appl. No.: 17/329,436

(22) Filed: May 25, 2021

(65) Prior Publication Data

US 2022/0393468 A1    Dec. 8, 2022

(51) Int. Cl.
G05B 17/02    (2006.01)
H02J 3/14    (2006.01)
(Continued)

(52) U.S. Cl.
CPC ............ *H02J 3/0012* (2020.01); *G05B 17/02* (2013.01); *H02J 3/144* (2020.01); *H02J 13/00002* (2020.01); *H02J 2203/20* (2020.01)

(58) Field of Classification Search
CPC .... H02J 3/0012; H02J 13/00002; H02J 3/144; H02J 2203/20; G05B 17/02
(Continued)

(56) References Cited

U.S. PATENT DOCUMENTS 3,849,637 A    11/1974   Caruso
4,916,328 A     4/1990   Culp
(Continued)

FOREIGN PATENT DOCUMENTS

CN    101545953    1/2011
DE     10200733    7/2003
EP      1381132    9/2010

OTHER PUBLICATIONS

Kai Sun, Da-Zhong Zheng, and Qiang Lu, "Splitting Strategies for Islanding Operation of Large-Scale Power Systems Using OBDD-based methods," in IEEE Transactions on Power Systems, vol. 18, No. 2, pp. 912-923, May 2003.
(Continued)

*Primary Examiner* — Jigneshkumar C Patel
(74) *Attorney, Agent, or Firm* — Bradley W. Schield; Richard M. Edge

(57) ABSTRACT

An autonomous real-time remedial action scheme (RAS) control system may receive electrical measurements of a power system. The RAS control system may determine active power and reactive power of each bus in the power system based on the received electrical measurements. The RAS control system may dynamically determine whether to shed one or more loads, generators, or both in the power system by optimizing an objective function to maintain maximum critical load and maximum critical generation in the electrical system based on the active and reactive power of each bus in the power system and the generation of each generator in the power system. The RAS control system may send a command to trip at least one breaker to cause the at least one breaker to shed the one or more loads, generators, or both. The RAS control system may send a command to runback one or more generators.

21 Claims, 5 Drawing Sheets

(51) Int. Cl.
*H02J 3/00* (2006.01)
*H02J 13/00* (2006.01)

(58) Field of Classification Search
USPC .......................................................... 700/287
See application file for complete search history.

(56) References Cited

U.S. PATENT DOCUMENTS

| | | | |
|---|---|---|---|
| 5,436,510 A | 7/1995 | Gilbert | |
| 6,204,642 B1 | 3/2001 | Lawson | |
| 6,492,801 B1 | 12/2002 | Sims | |
| 6,608,635 B1 | 8/2003 | Mumm | |
| 7,356,422 B2 | 4/2008 | Schweitzer, III | |
| 7,698,233 B1 | 4/2010 | Edwards | |
| 8,131,383 B2 | 3/2012 | Pearson | |
| 8,248,060 B2 | 8/2012 | Schweitzer | |
| 8,604,803 B2 | 12/2013 | Dooley | |
| 8,606,372 B1 | 12/2013 | Harris | |
| 8,744,638 B2 | 6/2014 | Tyagi | |
| 9,519,301 B2 | 12/2016 | Bartlett | |
| 9,568,516 B2 | 2/2017 | Gubba Ravikumar | |
| 10,333,301 B2 | 6/2019 | Gubba Ravikumar | |
| 10,763,695 B2 | 10/2020 | Khatib | |
| 10,931,109 B2 | 2/2021 | Cai | |
| 10,992,134 B2 | 4/2021 | Cai | |
| 11,009,931 B2 | 5/2021 | Khatib | |
| 2002/0091503 A1 | 7/2002 | Carrillo | |
| 2003/0042876 A1 | 3/2003 | Sadafumi | |
| 2003/0088809 A1 | 5/2003 | Gulati | |
| 2004/0124812 A1 | 7/2004 | Delmerico | |
| 2004/0164717 A1 | 8/2004 | Thompson | |
| 2005/0285574 A1 | 12/2005 | Huff | |
| 2007/0162189 A1 | 7/2007 | Huff | |
| 2007/0168088 A1 | 7/2007 | Ewing | |
| 2007/0219755 A1 | 9/2007 | Williams | |
| 2007/0239372 A1 | 10/2007 | Schweitzer | |
| 2007/0239373 A1 | 10/2007 | Nasle | |
| 2008/0074810 A1 | 3/2008 | Guzman-Casillas | |
| 2009/0085407 A1 | 4/2009 | Venkatasubramanian | |
| 2009/0299664 A1* | 12/2009 | Zhang | G05F 1/70 |
| | | | 702/65 |
| 2010/0312414 A1 | 12/2010 | Kumar | |
| 2011/0004425 A1 | 1/2011 | Schweitzer | |
| 2011/0022245 A1 | 1/2011 | Goodrum | |
| 2011/0054709 A1 | 3/2011 | Son | |
| 2011/0320058 A1 | 12/2011 | Rietmann | |
| 2012/0123602 A1 | 5/2012 | Sun | |
| 2012/0232710 A1 | 9/2012 | Warner | |
| 2012/0310434 A1 | 12/2012 | Taft | |
| 2012/0310559 A1 | 12/2012 | Taft | |
| 2013/0035885 A1 | 2/2013 | Sharon | |
| 2013/0066480 A1* | 3/2013 | Glavic | H02J 3/24 |
| | | | 700/286 |
| 2013/0074513 A1 | 3/2013 | Mueller | |
| 2013/0166085 A1 | 6/2013 | Cherian | |
| 2014/0001847 A1 | 1/2014 | Khandelwal | |
| 2014/0100705 A1 | 4/2014 | Shi | |
| 2014/0316604 A1 | 10/2014 | Ortjohann | |
| 2015/0054339 A1 | 2/2015 | Zhao | |
| 2015/0077133 A1 | 3/2015 | Fischer | |
| 2015/0088439 A1* | 3/2015 | Coffrin | H02J 3/007 |
| | | | 702/60 |
| 2015/0094871 A1 | 4/2015 | Bhageria | |
| 2015/0241894 A1 | 8/2015 | Bartlett | |
| 2015/0244170 A1* | 8/2015 | Bartlett | H02J 4/00 |
| | | | 700/287 |
| 2015/0244171 A1 | 8/2015 | Bartlett | |
| 2017/0077700 A1 | 3/2017 | Sun | |
| 2019/0103762 A1* | 4/2019 | Dolezilek | H03K 19/17724 |
| 2020/0358310 A1 | 11/2020 | Khatib | |

OTHER PUBLICATIONS

Mark Grant, "Foxboro SCADA Systems Load Shedding and Electrical Monitoring Control Systems Design in Industrial Process Plants", 2012, retrieved on May 5, 2016 from http://iom.invensys.com/EN/pdfLibrary/WhitePaper_LoadSheddingandElectricalMonitoring.pdf.

Gao. "Remedial Action Schemes Derived from Dynamic Security Assessment." Mar. 16, 2012. Retrieved from <https://www.diva-portal.org/smash/get/diva2:510598/FULLTEXT01.pdf> entire document.

Madami et al. "Design and Implementation of Wide Area Special Protection Schemes." In: 2004 57th Annual Conference for Protective Relay Engineers. Apr. 1, 2004. Retrieved from <https://www.gegridsolutions.com/smartgrid/Apr06/Wide_Area_Special_Protection_Schemes.pdf> entire document.

North American Electric Reliability Corporation (NERC). "Special Protection Systems (SPS) and Remedial Actions Schemes (RAS): Assessment of Definition , Regional Practices, and Application of Related Standards." Apr. 2013. Retrieved from <https://www.nerc.com/pa/Stand/Prjct201005_2SpclPrtctnSstmPhs/System_Protection_and_Control_Subcommittee_SPCS_20_SAMS-SPCS_SPS_Technic_02182014.pdf> entire document.

* cited by examiner

US 11,735,913 B2

AUTONOMOUS REAL-TIME REMEDIAL ACTION SCHEME (RAS)

TECHNICAL FIELD

The present disclosure relates generally to electric power delivery systems and, more particularly, to an autonomous real-time remedial action scheme (RAS).

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
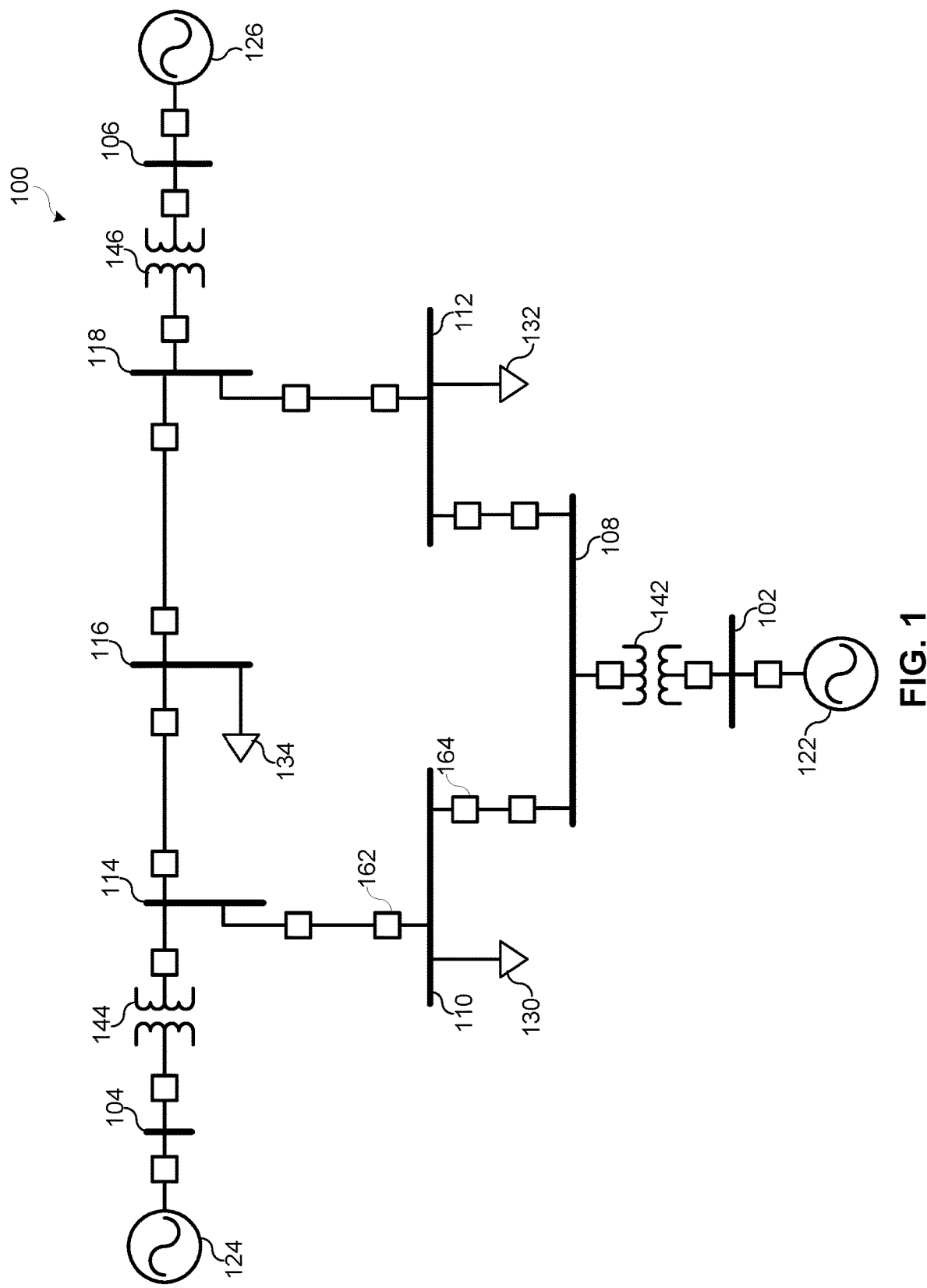
FIG. 1 illustrates a simplified one-line diagram of an electric power delivery system, in accordance with embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems are used to transmit electric power from generation to load. Electric power delivery RAS control systems may be used to monitor the power being delivered and to make control decisions regarding such electric power delivery systems. For example, electric power delivery RAScontrol systems may take one or more control actions upon occurrence of a contingency in the system. A contingency may refer to loss and/or failure of equipment on the electric power delivery system, an overcurrent, undercurrent, overvoltage, or undervoltage on the electric power delivery system, or the like. These contingencies may be caused by faults, generator failure, transformer failure, or any other event on the power delivery system. In some cases, the contingency may impact the power being generated and/or the power being demanded. Electric power delivery RAScontrol systems may perform control action(s), such as shedding loads and/or shedding power generation and/or runback power generation, to balance power generation with power demand upon occurrence of the contingency to maintain operation of the electric power delivery system.

Decisions to shed load may be made based on active/reactive power being delivered and consumed or the frequency of the current/voltage. For example, if active power being generated and delivered to the loads is less than the active power demands of the loads, one or more loads may be shed from the electric power delivery system to balance active power being generated with active power demand. Similarly, reactive power may be balanced to prevent undesirable voltage behaviors (e.g., voltage collapses or protection trips).

Traditionally, RAS control system may be implemented by conducting an extensive study to create an action table for each contingency. The RAS controller is programmed to detect the contingency and issue controls based on the action table. Upon occurrence of a contingency, the RAS sheds loads and/or sheds generation and/or runback generation listed in the action table for the contingency.

However, these action tables are static and remain unchanged after the system is commissioned. Such action tables are usually based on certain system topology and loading conditions. If the system topology and loading conditions need major changes, the pre-study may be conducted again to update the action table. Even if there is a temporary change on the power system, the action table may be updated to ensure proper operation of the system. Further, if more contingencies occur than were accounted for in the action table, the RAS control system may not be able to respond sufficiently. Updating the action table is a time-consuming and difficult task.

As described below, an autonomous real-time RAS control system may calculate remedial actions on the fly. That is, the RAS described below may determine remedial actions without a pre-determined action table or pre-studies of the power system. Because the remedial actions are calculated on the fly, the RAS does not need to update when topology and loading conditions change. Further, an autonomous real-time RAS system described herein by perform corrective actions for any combination of contingencies occurring (e.g., N-2 contingency, N-3 contingency etc.).

FIG. 1 illustrates a simplified one-line diagram of a topology of an electric power delivery system 100, according to one embodiment. The topology may include the connections between the equipment/components of the electric power delivery system. The illustrated diagram is similar to the IEEE 9-bus system and is used herein as an example. The system includes a first bus 102 in electrical communication with a first generator 122, which is in electrical communication with a fourth bus 108 through a first transformer 142. A second generator 124 is in electrical communication with a second bus 104, which is in electrical communication with a seventh bus 114 through a second transformer 144. A third generator 126 is in electrical connection with a third bus 106, which is in electrical communication with a ninth bus 118 through a third transformer 146. The seventh bus 114 is in electrical communication with the ninth bus 118 via the eighth bus 116. The seventh bus 114 is in electrical communication with a fifth bus 110. The ninth bus 118 is in electrical communication with sixth bus 112. Both the fifth bus 110 and the sixth bus 112 are in electrical communication with the fourth bus 108. The fifth bus 110 is in electrical communication with a first load 130. The sixth bus 112 is in electrical communication with a second load 132. The eighth bus 116 is in electrical communication with a third load 134.

For ease of discussion in the voltage assessment prediction described hereunder, Table A shows the translation of the element numbers illustrated in FIG. 1 and the element names according to the IEEE 9-bus system:

TABLE A

| FIG. 1 Element Number | IEEE 9-Bus System Elements |
| --- | --- |
| 102 | Bus 1 |
| 104 | Bus 2 |
| 106 | Bus 3 |
| 108 | Bus 4 |
| 110 | Bus 5 |
| 112 | Bus 6 |
| 114 | Bus 7 |
| 116 | Bus 8 |
| 118 | Bus 9 |
| 122 | Generator 1 |
| 124 | Generator 2 |
| 126 | Generator 3 |
| 130 | Load A |
| 132 | Load B |
| 134 | Load C |
| 142 | Transformer 1 |
| 144 | Transformer 2 |
| 146 | Transformer 3 |

Figure 2:
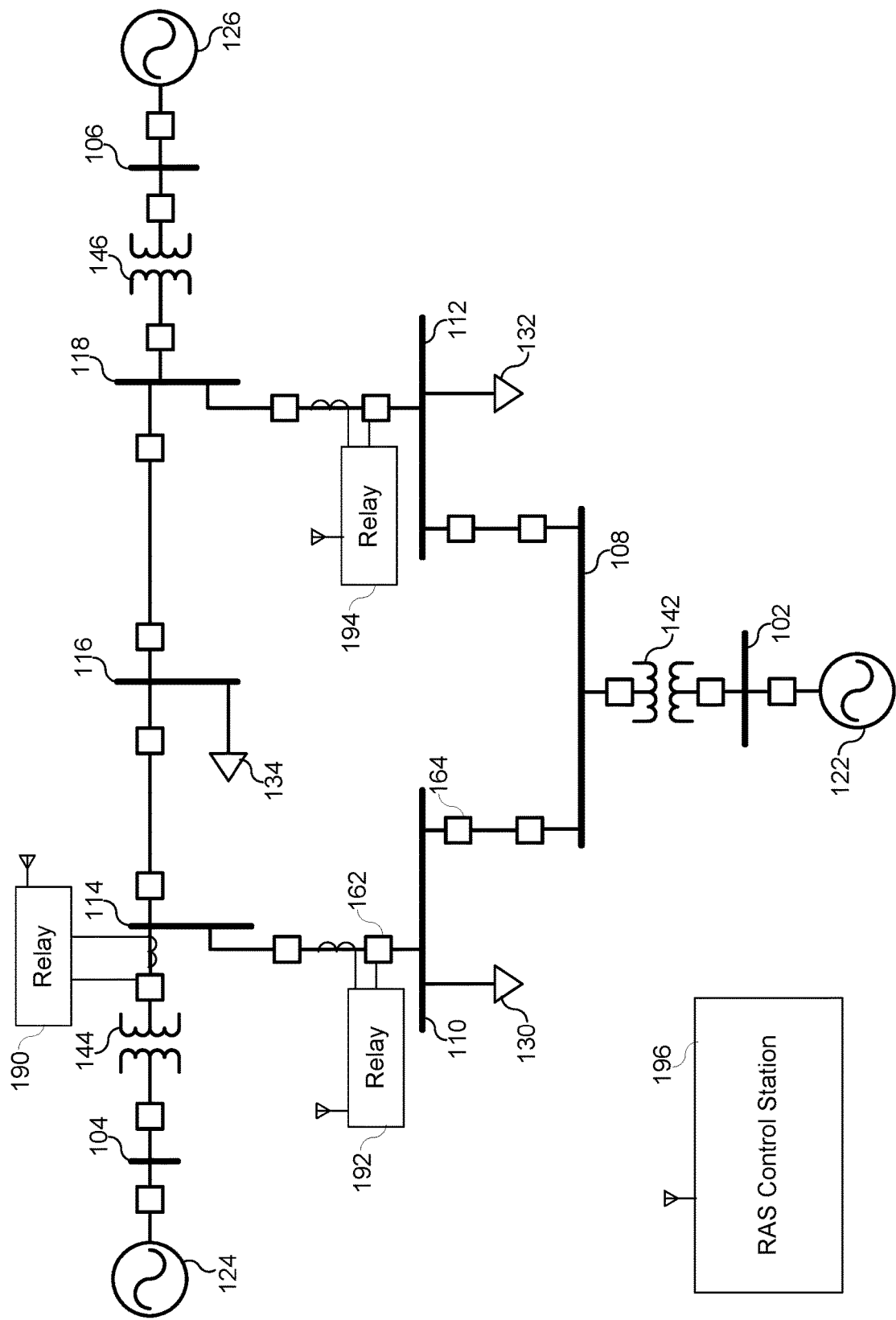
FIG. 2 illustrates a RAS control system for the electric power delivery system of FIG. 1, in accordance with embodiments of the present disclosure.

FIG. 2 is a block diagram of a RAS control system that may be used for monitoring and control of the electric power system 100 of FIG. 1. The RAS control system may include one or more intelligent electronic devices (IEDs). As used herein, an IED (such as relays 190, 192, and 194) may refer to any microprocessor-based device that monitors, controls, automates, and/or protects monitored equipment within system the electric power delivery system 100. Such devices may include, for example, remote terminal units, differential relays, distance relays, directional relays, feeder relays, overcurrent relays, voltage regulator controls, voltage relays, breaker failure relays, generator relays, motor relays, faulted circuit indicators, automation controllers, bay controllers, meters, recloser controls, communications processors, computing platforms, programmable logic controllers (PLCs), programmable automation controllers, input and output modules, digital sample publishing units, merging units, and the like. The term IED may be used to describe an individual IED or a system comprising multiple IEDs.

While FIGS. 1 and 2 illustrate an example power system, any suitable power system may be monitored by the RAS control system 196. Further, while three IEDs are shown in FIG. 2, any suitable number of IEDs may be used to monitor, control, and protect various power systems. It is appreciated that the systems and methods described herein may be applied as described and/or with adaptation to a wide variety of electrical system configurations, including but not limited to microgrids, industrial facilities, oil platforms, etc. Each of the IEDs 190, 192, and 194 may monitor operating characteristics of the power system, such as current, voltage, circuit breaker status, and the like, and may communicate operating characteristics with a central RAS station 196. As explained below, the RAS control station 196 may determine both active and reactive power of the buses in the power system from the operating characteristics communicated by the IEDs 190, 192, 194 and provide protective actions to the IEDs 190, 192, and 194 to control the electric power delivery system 100.

Figure 3:
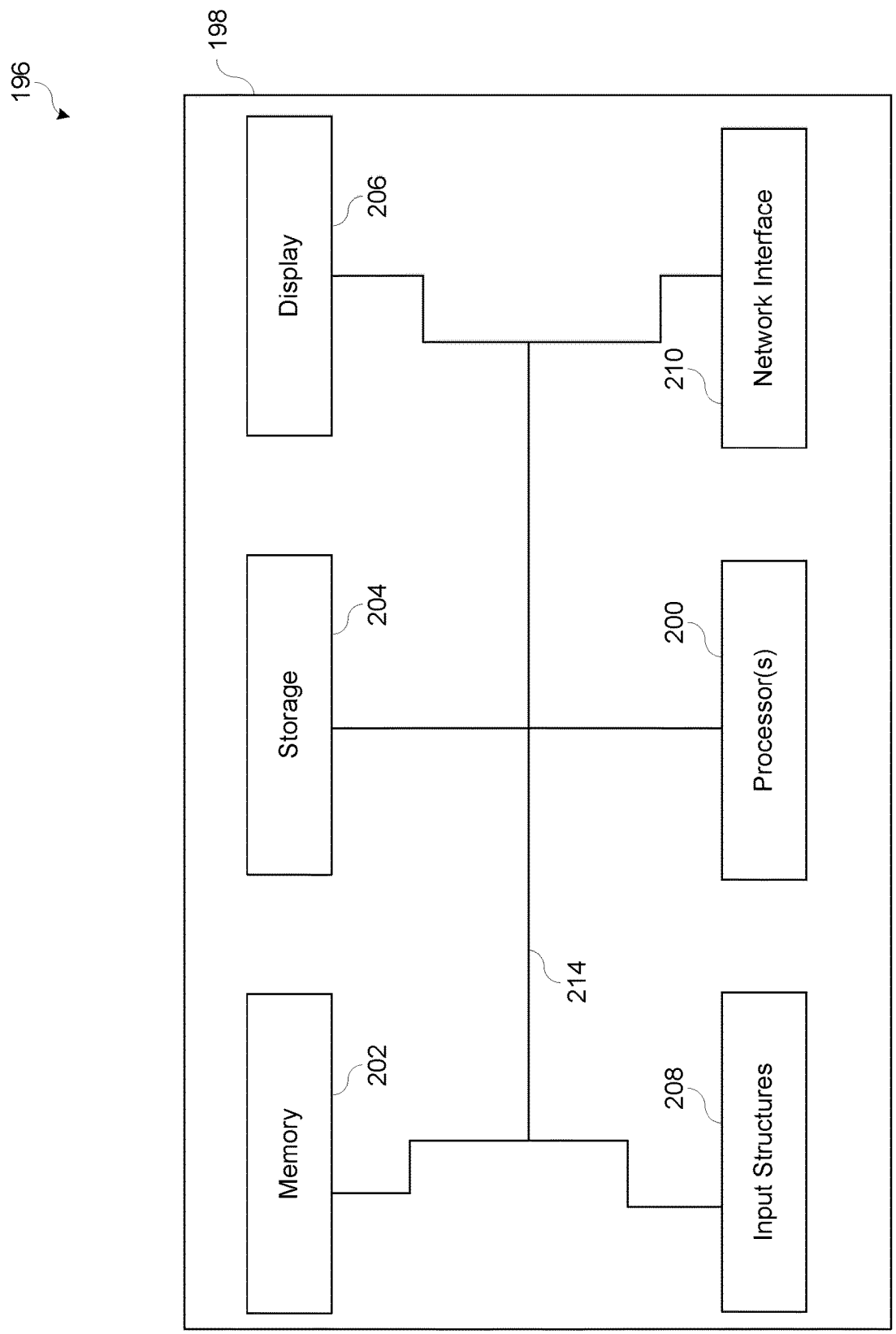
FIG. 3 illustrates a block diagram of the RAS control system of FIG. 2, in accordance with embodiments of the present disclosure.

FIG. 3 is a block diagram of the RAS control system 196 that may be used to monitor and control the electric power delivery system 100. The RAS control system 196 may be located at any suitable location, such as at a power plant of the power generator 122 or at another facility. The RAS control system 196 may include one or more electronic device(s) 198 according to an embodiment of the present disclosure, which may include, among other things, one or more processor(s) 200, memory 202, nonvolatile storage 204, a display 206, input structures 208, and network interface 210. The various functional blocks shown in FIG. 3 may include hardware elements (including circuitry), software elements (including computer code stored on a computer-readable medium) or a combination of both hardware and software elements. It should be noted that FIG. 3 is merely one example of a particular implementation and is intended to illustrate the types of components that may be present in the electronic device 198. The processor 200 may be a single contained processing module or may be incorporated wholly or partially within any of the other elements within the electronic device 190.

In the electronic device 198 of FIG. 3, the processor 200 may be operably coupled, via one or more communication buses 214, with the memory 202 and the nonvolatile storage 204 to perform various algorithms. Such programs or instructions executed by the processor 200 may be stored in any suitable article of manufacture that includes one or more tangible, computer-readable media at least collectively storing the instructions or routines, such as the memory 202 and the nonvolatile storage 204. The memory 202 and the nonvolatile storage 204 may include any suitable articles of manufacture for storing data and executable instructions, such as random-access memory, read-only memory, rewritable flash memory, hard drives, and optical discs. In some embodiments, the nonvolatile storage 204 and/or the processor 200 may be implemented as hardware components, such as via discrete electrical components, via a field programmable gate array (FPGA), and/or via one or more application specific integrated circuits (ASICs) and may be referred to generally as processing circuitry. Further, the instructions or routines may be provided to the processor 200 to produce a machine, such that the instructions, when executed by the processor 200, implement the operations/acts specified in the flowchart described below with respect to FIG. 5.

The input structures 208 of the electronic device 198 may enable a user to interact with the electronic device 198 (e.g., activating a control action) via the display 206. The display 206 may be any suitable display that allows users to view images generated on the electronic device 198, such as a liquid crystal display (LCD), organic light emitting diode (OLED) display, or the like.

According to various embodiments, the RAS control system 196 may comprise one or more of a variety of types of systems. For example, central RAS control system 196 may include a supervisory control and data acquisition (SCADA) system and/or a wide area control and situational awareness (WACSA) system. The RAS control system 196 may provide control operations for the power delivery system 100. In some embodiments, intelligent electronic devices (IEDs) may be in communication with the RAS control system 196. The IEDs may communicate over various media such as a direct communication or over a wide-area communications network. The network interface 210 may include, for example, communication circuitry suitable to communicate wirelessly with the IEDs. The RAS control system 196 may receive signal(s) from one or more of the power generators 122, 124, and 126, one or more of the loads 130, 132, and 134, and/or one or more other electronic devices, such as one or more IEDs, on the power delivery system 100.

The RAS control system 196 may determine corrective actions online by linear approximation of power characteristics, such as linear approximation of power flow (e.g., linear approximation of active and reactive power losses) and linear approximation of constraints of power flow on transmission lines. By using linear approximation of power characteristics in the power system, the RAS control system 196 may perform corrective actions that maximize the effectiveness of the power system for any number of contingencies and for any given state of the power system without adjusting a predetermined action table.

Some of the constraints may be approximations derived from power flow equations. The power flow equations may be stated as:

$$P_k = V_k \sum_{m \in S} V_m (G_{km} \cos \delta_{km} + B_{km} \sin \delta_{km}) \quad \text{Eq. 1}$$

$$Q_k = V_k \sum_{m \in S} V_m (G_{km} \sin \delta_{km} - B_{km} \cos \delta_{km}) \quad \text{Eq. 2}$$

where $P_k$ and $Q_k$ are active and reactive power injected into node k and are equal to the total power generation minus total load consumption for bus k, $V_k$ and $V_m$ are voltage magnitudes at buses k and m, S is the set of the buses in the system, $\delta_{km} = \delta_k - \delta_m$, $\delta_k$ and $\delta_m$ are the voltage angles of bus k and bus m, and $G_{km}$ and $B_{km}$ are the active and reactive part of $Y_{km}$, the (k, m)th element of the bus admittance matrix. The voltage magnitudes $V_k$ and $V_m$ may be represented as:

$$V_k = 1.0 + \Delta V_k \quad \text{Eq. 3}$$

$$V_m = 1.0 + \Delta V_m \quad \text{Eq. 4}$$

where $\Delta V_k$ and $\Delta V_m$ are bus k and bus m voltage deviation from nominal bus voltage 1.0 per unit. Normally $\Delta V_k$, $\Delta V_m \leq 0.1$. Based on Tayler series, $\cos \delta_{km}$ and $\sin \delta_{km}$ can be represented as:

$$\cos \delta_{km} = 1 - \frac{\delta_{km}^2}{2} + \frac{\delta_{km}^4}{24} - \ldots \quad \text{Eq. 5}$$

$$\sin \delta_{km} = \delta_{km} - \frac{\delta_{km}^3}{6} + \frac{\delta_{km}^5}{120} - \ldots \quad \text{Eq. 6}$$

Considering that $\Delta V_k$, $\Delta V_m$ and $\delta_{km}$ terms may be relatively small, higher order terms or the products of these terms may be removed as shown:

$$\sum_{i \in KG} PG_i - \sum_{j \in KL} PL_j \text{Brk\_L}_j \approx \quad \text{Eq. 7}$$

$$\sum_{m \in S} (-B_{km} \delta_m + G_{km} V_m) + \delta_k b_{kk} + \Delta V_k g_{kk} - \frac{1}{2} \sum_{m \in S} G_{km} \delta_{km}^2$$

$$\sum_{i \in KG} QG_i - \sum_{j \in KL} QL_j \text{Brk\_L}_j \approx \quad \text{Eq. 8}$$

$$\sum_{m \in S} (-G_{km} \delta_m - B_{km} V_m) + \delta_k g_{kk} - \Delta V_k b_{kk} + \frac{1}{2} \sum_{m \in S} B_{km} \delta_{km}^2$$

where $PG_i$ and $QG_i$ are active and reactive power generated by generator i which is connected to bus k, KG is the set of generators connected to bus k, $PL_j$ and $QL_j$ are active and reactive power of load j that is connected to bus k, KL is the set of loads connected to bus k, $\text{Brk\_L}_j$ is the breaker status of load j, $g_{kk}$ and $b_{kk}$ are the active and reactive part of the $k^{th}$ diagonal element in the $Y_{bus}$ matrix.

The last terms in equations (7) and (8) are in quadratic form and express the active power loss and reactive power loss from the power flow equations. To linearize the quadratic terms, piecewise linearization techniques may be used.

Figure 4:
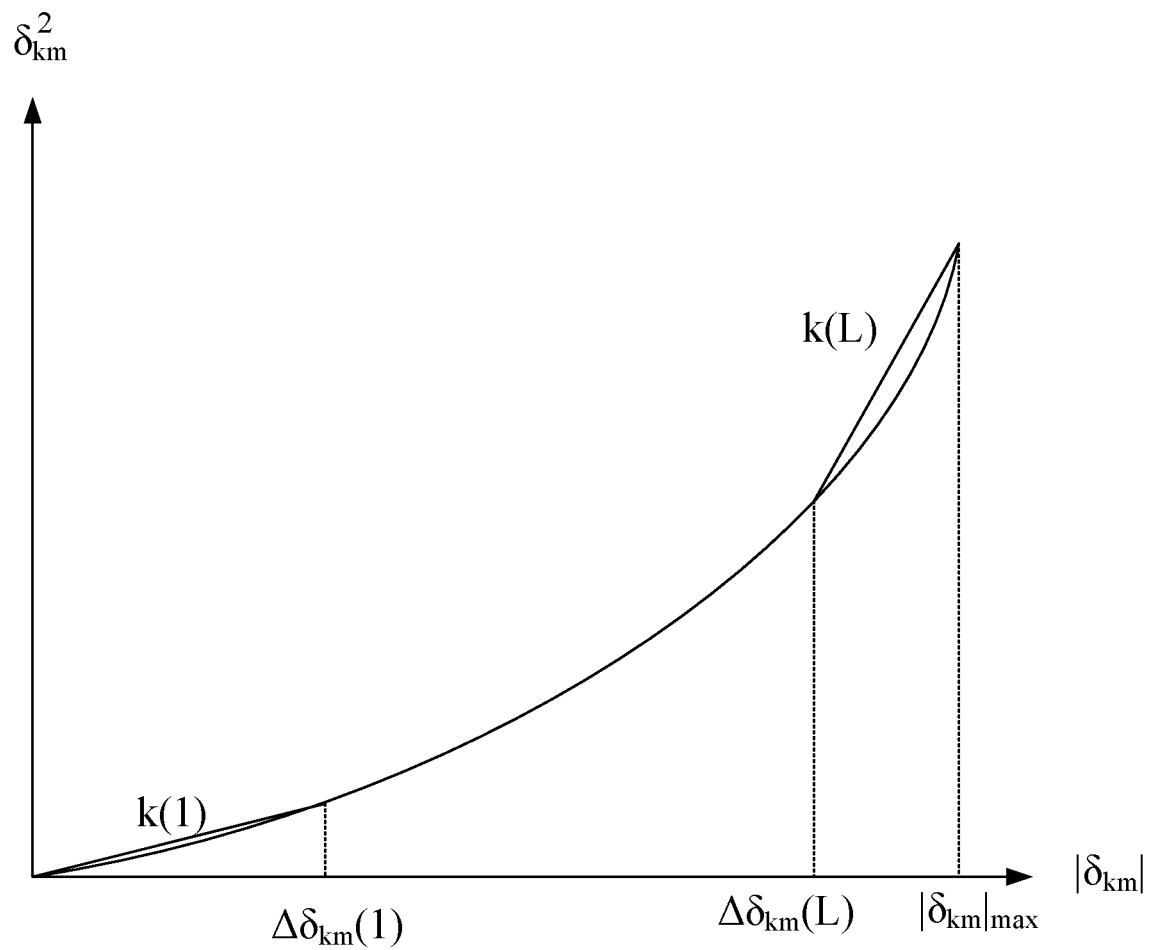
FIG. 4 illustrates a plot of a linearization of a phase angle difference between voltages of buses in the electric power delivery system of FIG. 1, in accordance with embodiments of the present disclosure.

FIG. 4 is a plot using L linear segments to approximate the curve of $\delta_{km}^2$, where k(i) is the slope of the $i^{th}$ segment. $|\delta_{km}|_{max}$ is a constant that limits the maximum angle difference between two adjacent buses and may be determined using any suitable known method (e.g., user input, calculation, etc.). The projection of segment i to the x axis is $|\delta_{km}|_{max}/L$ and the project to y axis is $(2i-1)|\delta_{km}|_{max}^2/L^2$. The expression of $\delta_{km}^2$, is approximated as:

$$\delta_{km}^2 = \sum_{i=1}^{L} k(i) \Delta \delta_{km}(i) \quad \text{Eq. 9}$$

Note that k(i) is a monotonically function and expressed as:

$$k(i) = (2i - 1) \frac{|\delta_{km}|_{max}}{L} \quad \text{Eq. 10}$$

If the objective function is to minimize $-\delta_{km}^2$ and $\Delta \delta_{km}(i) > 0$, for all $1 \leq i$:

$$\Delta \delta_{km}(l) = \frac{|\delta_{km}|_{max}}{L} \quad \text{Eq. 11}$$

Overall, any given $\Delta \delta_{km}(i)$ is less than or equal to the maximum length of each segment:

$$0 \leq \Delta \delta_{km}(i) \leq \frac{|\delta_{km}|_{max}}{L} \quad \text{Eq. 12}$$

To establish the relationship between $\delta_k$, $\delta_m$ and the sum of L segments of angle difference that accounts for the positive value (e.g., from the positive side ($\delta_{km}^+$) and the negative side ($\delta_{km}^-$)), two non-negative variables $\delta_{km}^+$ and $\delta_{km}^-$ are created and defined as:

$$\delta_k - \delta_m = \delta_{km}^+ - \delta_{km}^- \quad \text{Eq. 13}$$

$$\sum_{i=1}^{L} \Delta \delta_{km}(i) = \delta_{km}^+ + \delta_{km}^- \text{ where } \delta_{km}^+ \geq 0 \text{ and } \delta_{km}^- \geq 0. \quad \text{Eq. 14}$$

Hence, the power flow equations may be expressed as:

$$\sum_{i \in KG} PG_i - \sum_{j \in KL} PL_j \text{Brk\_L}_j = \sum_{m \in S} (-B_{km} \delta_m + G_{km} V_m) + \quad \text{Eq. 15}$$

$$\delta_k b_{kk} + \Delta V_k g_{kk} - \frac{1}{2} \sum_{m \in S} \sum_{i=1}^{L} (2i - 1) G_{km} \frac{|\delta_{km}|_{max}}{L} \Delta \delta_{km}(i)$$

$$\sum_{i \in KG} QG_i - \sum_{j \in KL} QL_j \text{Brk\_L}_j = \sum_{m \in S} (-G_{km} \delta_m - B_{km} V_m) + \quad \text{Eq. 16}$$

-continued $$\delta_k g_{kk} - \Delta V_k b_{kk} + \frac{1}{2}\sum_{m\in S}\sum_{i=1}^{L}(2i-1)B_{km}\frac{|\delta_{km}|_{max}}{L}\Delta\delta_{km}(i)$$

The power flow through a transmission line may be calculated as:

$$P_{km} = \frac{R_{km}}{Z_{km}^2}(V_k^2 - V_k V_m \cos\delta_{km}) + \frac{X_{km}}{Z_{km}^2}V_k V_m \sin\delta_{km} \qquad \text{Eq. 17}$$

$$Q_{km} = \frac{X_{km}}{Z_{km}^2}(V_k^2 - V_k V_m \cos\delta_{km}) - \frac{R_{km}}{Z_{km}^2}V_k V_m \sin\delta_{km} \qquad \text{Eq. 18}$$

Where $P_{km}$, and $Q_{km}$ are active and reactive power flow through the transmission line between bus k and bus m; $R_{km}$, $X_{km}$, and $Z_{km}$ are the resistance, reactance, and impedance of the transmission line between bus k and bus m; $\delta_{km}$ is the angle difference between bus k and bus m.

By taking equations (5) and (6) into (17) and (18), removing the higher order and relatively smaller value multiplication terms, and by simplifying the equations with the following approximations ($R_{km}$~0, $X_{km}$~$Z_{km}$, $V_k$~1.0 pu and $V_m$~1.0 pu), power flow of transmission lines may be calculated as:

$$P_{km} = \frac{\delta_k - \delta_m}{X_{km}} \qquad \text{Eq. 19}$$

$$Q_{km} = \frac{V_k - V_m}{X_{km}} \qquad \text{Eq. 20}$$

The constraints of transmission line flow is:

$$\sqrt{P_{km}^2 + Q_{km}^2} \leq |S_{km}^{max}| \qquad \text{Eq. 21}$$

where $S_{km}^{max}$ is the maximum limit of the power allowed for transmission line between bus k and bus m. To linearize this constraint, a piecewise approximation of the boundary may be used. The expression of the transmission line constraints can be expressed as:

$$-aS_{km}^{max} \leq bP_{km} + cQ_{km} \leq aS_{km}^{max} \qquad \text{Eq. 22}$$

where a, b and c are constants that may be selected depending on the implementation. If six-line segments are used to define the boundary, the constraints are expressed as:

$$-0.866 S_{km}^{max} \leq Q_{km} \leq 0.866 S_{km}^{max} \qquad \text{Eq. 23}$$

$$-1.732 S_{km}^{max} \leq 1.732 P_{km} \pm Q_{km} \leq 1.732 S_{km}^{max} \qquad \text{Eq. 24}$$

The number of line segments to approximate the boundary may be changed. A larger number of line segments may improve the accuracy of the boundary at the cost of increasing calculation burdens.

To quickly and reliably calculate remedial actions, the RAS system 196 may model the power system using linear optimization to meet the equality constraints above, meet the inequality constraints of equations (12), (22)-(24), and (26)-(29), and to maximize an objective function. In the illustrated embodiment, the objective of the model is to maximize the active power loads with consideration of higher weights on the higher priority loads and to maximize active power from generators with consideration of weights of the generators. As such, the objective function may be defined as:

$$\text{Max: } \sum_{i=1}^{N_L} W_i * PL_i * Brk\_L_i + \sum_{j=1}^{N_G} WG_j * PG_j \qquad \text{Eq. 25}$$

where $N_L$ is the number of loads in the system, $W_i$ is the weight factor of load i, $PL_i$ is the active power of load i, and $Brk\_L_i$ is the breaker status of load i, $N_G$ is the number of generators in the system, $WG_j$ is the weight factor of generator j, $PG_j$ is the active power of generator j.

The inequality constraints of remedial action controls may include equations (12), (22)-(24), and (26)-(29) stated as follows:

$$PG_j^{min} \leq PG_j \leq PG_j PG_j^{max} \qquad \text{Eq. 26}$$

$$QG_j^{min} \leq QG_j \leq QG_j^{max} \qquad \text{Eq. 27}$$

$$V_i^{min} \leq V_i \leq V_i^{max} \qquad \text{Eq. 28}$$

$$0 \leq Brk\_L_i \leq 1 \qquad \text{Eq. 29}$$

where $PG_j^{min}$ and $PG_j^{max}$ are lower and upper limits of active power output of generator j, $QG_j^{min}$ and $QG_j^{max}$ are lower and upper limits of reactive power output of generator j, $V_i^{min}$ and $V_i^{max}$ are lower and upper limits of voltage magnitude of bus i, $PG_j$ and $QG_j$ are the active and reactive power output of generator j, $V_i$ is bus voltage magnitude of bus i, and $Brk\_L_i$ is a breaker status (e.g., open as 0, closed as 1) of Load i.

The equality constraints of the RAS control system may be expressed as equations (11), (13)-(16), (19), and (20). The proposed RAS system uses the system topology, line impedance, generator operating limits, bus voltage operating limits, transmission line limits, breaker status of each of the branches and loads, active power and reactive power of loads, and active power of generators to determine a corrective action to balance the active power generated with the active power being consumed and reduce the overloading of transmission lines. Further, the processor 200 may use the objective function to optimize (e.g., maximize) the generation and loads thereby ensuring an optimal corrective action according to the contingency.

The breaker status of loads in equation (29) may be modeled as a continuous variable. In practice, the breaker status may be modeled with a discrete number where 1 represents closed and 0 represents open. A threshold constant may be used to define whether the breaker status is open or closed. For loads, the breaker status may be determined as:

$$\text{Load } Brk \text{ Status} = \begin{cases} 0 & \text{if } Brk\_L_i < L_{threshold} \\ 1 & \text{if } Brk\_L_i \geq L_{threshold} \end{cases} \qquad \text{Eq. 30}$$

where $L_{threshold}$ is the threshold that is defined to determine whether the breaker status is open or closed. For generators, the breaker status can be determined by $$\text{Generator } Brk \text{ Status} = \begin{cases} 0 & \text{if } PG_j < PG_j^{max\,threshold} \\ 1 & \text{if } PG_j \geq PG_j^{max\,threshold} \end{cases} \qquad \text{Eq. 31}$$

where $PG_j^{max\,threshold}$ is a threshold that is defined to determine whether the generator breaker status is open or closed.

By using a breaker status variable to model a coupling relationship between active and reactive power load and discrete characteristics of load shedding, the RAS controller may prevent partial shedding of loads. Further, the RAS controller may send a command to runback one or more generators. Running back of generators may include rapidly decreasing the power, which may involve decreasing the generation without proceeding through normal control feedback loops (e.g., droop control, voltage control, etc.). Runback may be performed rapidly enough to allow for adequate balancing of generation and loads within a period of time (e.g., two cycles, three cycles, etc.) that ensures stability of the power system. By sending commands that cause operations that include rapidly decreasing the power via generator runback, load shedding via tripping circuit breakers, generation shedding via tripping circuit breakers, or any combination thereof, the RAS control system may balance the active power and reactive power generated and consumed.

Figure 5:
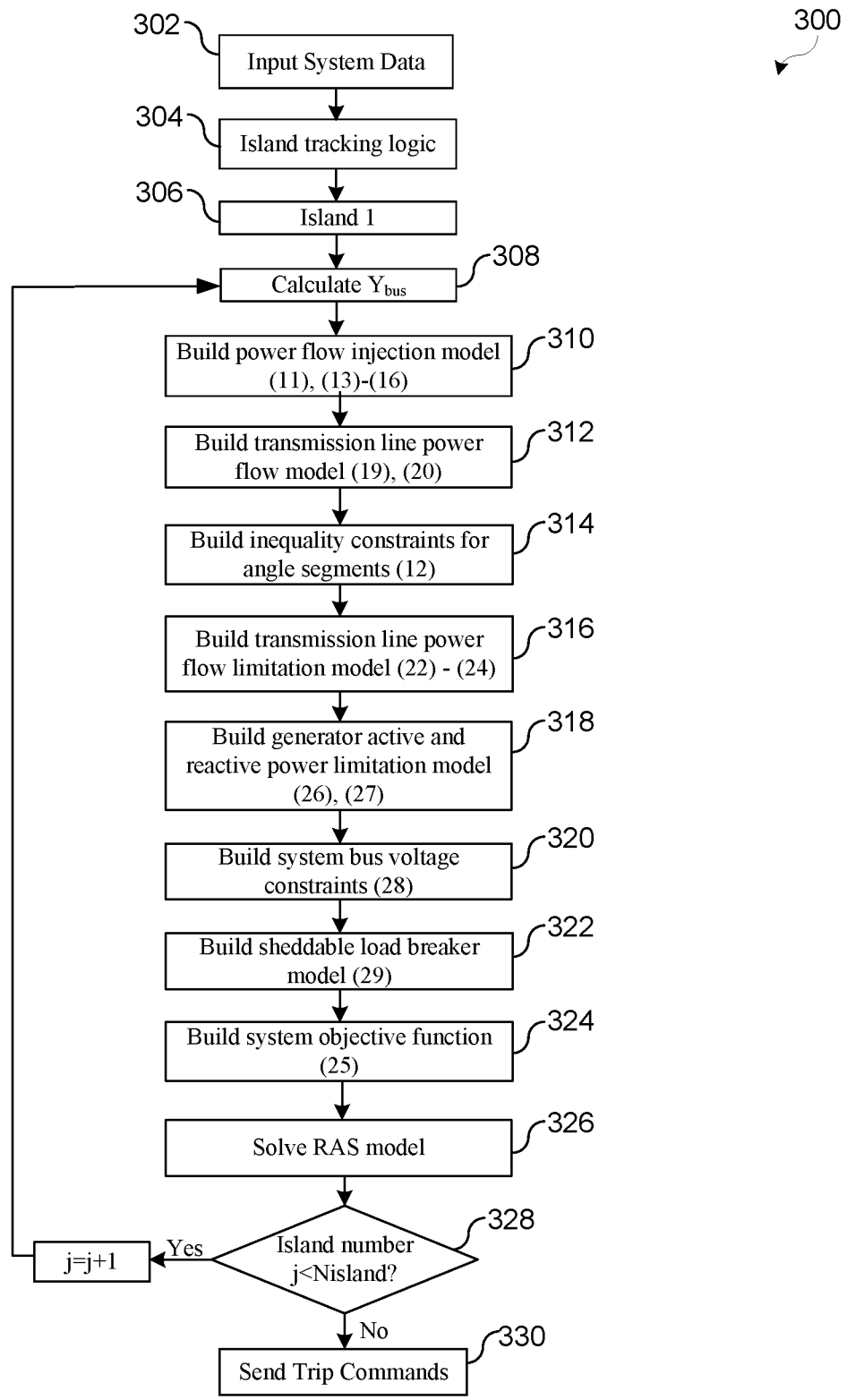
FIG. 5 illustrates a flow diagram of a process performed by the RAS control system of FIG. 2, in accordance with embodiments of the present disclosure.

FIG. 5 is a flow chart of a process 300 that may be performed by the processor 200 of the RAS control system 196 in monitoring and control operations of the electric power delivery system 100. The process 300 may be stored as instructions (e.g., code) in the memory 202 and/or the nonvolatile storage 204 to perform the operations described therein. The process 300 may begin with RAS control system 196 receiving system data (block 302). The system data may be received via the input structures 208 from user input, via the communication circuitry from one or more IEDs, or any other suitable method. The system data may include topology (e.g., equipment and connections therebetween), breaker status, line impedance, transformer settings, voltages, currents, generator operating limits, generator operating modes, bus voltage operating limits, and the like. The system data may further include load active power (MW) consumed and load reactive power (MVAR) consumed. That is, the RAS system 196 may receive the load MW and load MVAR consumed on each bus in the electric power delivery system 100. Further, if the power measurements of the load MW and load MVAR are not available, power measurements of substation feeders may be used to calculate load power and reactive power values.

The process 300 may be performed upon occurrence of a contingency from a list of contingencies, at regular intervals, or upon detecting a change in the topology of the power system. The processor 200 may determine the number of islands in the power delivery system (block 304). For example, an island may refer to a portion of the electric power delivery system 100 that may provide power (e.g., via a distributed generator) without being tied to the electrical power grid. The process 300 may begin with the first island (block 306). The processor 200 may calculate a $Y_{bus}$ admittance matrix for the first island (block 308). As mentioned above, the $Y_{bus}$ admittance matrix may be a matrix of admittances between each bus in the power delivery system 100 that is used to determine the values of the power flow equations (15) and (16).

The processor 200 may build the power flow injection model using equations (11) and (13)-(16) (block 310). The processor 200 may build the transmission line power flow model using equations (19) and (20) (block 312). By estimating transmission line power flow, the RAS scheme may limit available actions based on the limitations of power flow of the transmission lines. The processor 200 may build inequality constraints for angle segments using equation (12) (block 314). The processor may then build the transmission line power flow limitation model using equations (22)-(24) (block 316).

The process may continue with building the generator active and reactive power limitation model using equations (26) and (27) (block 318). For example, the RAS control system 196 may receive a status indicating a reactive power mode of the exciter of the generator and use the reactive power mode to set the reactive power limitations of the generator. The processor may 200 may build system bus voltage constraints using equation (28) (block 320). The processor 200 may continue by building a sheddable load breaker model using equation (29) (block 322).

The processor 200 may then build the system objective function using equation (25) (block 324). The processor 200 may then solve the RAS model by determining which circuit breakers to open and/or close to optimize the objective function (block 326). The process 300 may then be repeated for each island in the power system (block 328).

The processor 200 may indicate, via the display 206, that one or more loads may be shed based on the active power deficiency. Upon completing the RAS model, the processor 200 may send, via the network interface, a signal to one or more IEDs to cause the IED to trip one or more circuit breakers in the electric power delivery system 100 (block 330). For example, the processor 200 may send the trip command from the electronic device 198 to an IEDs to cause the IED to open the circuit breaker to shed the load.

That is, the processor 200 may, upon the occurrence of a contingency or a change in the state and/or topology of the power system, dynamically determine a corrective action of which loads and/or generation to shed by optimizing the objective function of equation (25) based on the active/reactive power of each bus in the power system and the generation of each generator in the power system. That is, the objective function may indicate which loads and/or generation to shed to provide a weighted maximum power generation to weighted maximum loads. By linearizing the objective function and by linearizing constraints (e.g., transmission line power constraints), the processor 200 may dynamically generate an optimized remedial action scheme that provides a corrective action that balances active/reactive power generation with active/reactive power consumption within time constraints (e.g., within 10 ms, 100 ms, 1 s, or 10 s) for performing control actions in the power system. Further, the processor 200 may dynamically determine the corrective action to be taken without a pre-set action table by using the linearized objective function and the linearized constraints.

Systems and methods described above may dynamically shed loads and/or generation by using linear optimization. The RAS scheme may use topology, line impedance, generating operating limits, bus voltage operating limits, transmission line limits, breaker status of each of the branches and loads, active power and reactive power of loads, and active power of generators to dynamically generate corrective actions in a power system to balance power generated with power consumed. Further, the corrective action may be obtained by linearizing an objective function that optimizes power consumption and generation given the state of the power system while accounting for load and generation priority. By dynamically generating corrective actions to perform while the RAS control system 196 is online, the monitoring and control system may perform control operations to prevent voltages in the power delivery system from exceeding or falling below desired operating ranges (e.g., voltage collapses) when any number of contingencies occur. Further, sufficient speed and stability of the power system may be achieved for shedding loads based on the active power and reactive power by using linear optimization. For example, the monitoring and control system may determine which loads and/or generation to shed in one control cycle time (e.g., within 2 ms) or within a limited number of control cycles (e.g., within 4 ms). The linear optimization in the embodiment described above uses a set of constraints and an objective function to maximize the active power of loads and generation while considering load priority. Further, the objective function may include the breaker condition as a discrete value.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory computer readable medium comprising instructions that, when executed by a processor, cause the processor to perform operations comprising:
   receiving electrical measurements of a power system;
   determining active power and reactive power of each bus in the power system based on the received electrical measurements;
   obtain user entered priorities of a remedial action scheme (RAS) controller that controls loads and generators of the power system;
   during a contingency on the power system, dynamically determining one or more optimal remedial actions that maximizes load and generation in the electrical delivery system according to the user entered priorities by optimizing an objective function based on the active power of each bus in the power system and the generation of each generator in the power system,
   the objective function comprising a function of load active power, load breaker status, and generator active power; and
   using linearized constraints of the power system comprising active power flow, reactive power flow, and transmission line constraints; and
   sending a command to perform the one or more remedial actions on the power system.

2. The non-transitory, computer readable medium of claim 1, comprising instructions that, when executed by a processor, cause the processor to perform operations comprising:
   dynamically determining whether to shed one or more loads, shed one or more generators, send a command to runback one or more generators, or any combination thereof, based on optimization of the objective function; and
   sending the command to perform runback of one or more generators, trip at least one breaker to shed the one or more loads, trip at least one breaker to shed the one or more generators, or any combination thereof.

3. The non-transitory, computer readable medium of claim 1, comprising instructions that, when executed by a processor, cause the processor to perform operations comprising receiving the user entered priorities via a human-to-machine interface (HMI) of the RAS controller.

4. The non-transitory, computer readable medium of claim 1, comprising instructions that, when executed by a processor, cause the processor to perform operations comprising determining the one or more optimal remedial actions for the power system using equality and inequality constraints of active power, reactive power, generator limits, transmission line limits, and bus voltage limits.

5. The non-transitory, computer readable medium of claim 1, wherein the objective function comprises:

$$\text{Max:} \sum_{i=1}^{N_L} W_i * PL_i * \text{Brk\_L}_i + \sum_{j=1}^{N_G} WG_j * PG_j$$

where $N_L$ is the number of loads in the power system, $W_i$ is the weight factor of load i, $PL_i$ is the active power of load i, and $\text{Brk\_L}_i$ is the breaker status of load i, $N_G$ is the number of generators in the system, $WG_j$ is the weight factor of generator j, and $PG_j$ is the active power of generator j, wherein the objective function is used to achieve minimum load shed, minimum generation shed, and minimum runback of the power system.

6. The non-transitory, computer readable medium of claim 1, using a breaker status variable to model a coupling relationship between active and reactive power load and discrete characteristics of load shedding to prevent partial shedding of loads.

7. The non-transitory, computer readable medium of claim 1, comprising instructions that, when executed by a processor, cause the processor to perform operations comprising optimizing the objective function within a set of constraints upon occurrence of one or more electrical system contingencies.

8. The non-transitory, computer readable medium of claim 1, comprising instructions that, when executed by a processor, cause the processor to perform operations comprising generating a mathematical optimization model to compute optimal remedial actions within a cycle time without pre-contingency study of the electrical power system.

9. The non-transitory, computer readable medium of claim 8, wherein a first transmission line constraint is expressed as:

$$-0.866 S_{km}^{max} \leq Q_{km} \leq 0.866 S_{km}^{max}$$

where $S_{km}^{max}$ is the maximum limit of the power allowed for transmission line between bus k and bus m and $Q_{km}$ is the reactive power flow through the transmission line between bus k and bus m.

10. The non-transitory, computer readable medium of claim 8, wherein a second transmission line constraint and a third transmission line constraint are expressed as:

$$-1.732 S_{km}^{max} \leq 1.732 P_{km} - Q_{km} \leq 1.732 S_{km}^{max}$$

$$-1.732 S_{km}^{max} \leq 1.732 P_{km} + Q_{km} \leq 1.732 S_{km}^{max}$$

where $S_{km}^{max}$ is the maximum limit of the power allowed for transmission line between bus k and bus m, $P_{km}$ the active power flow through the transmission line between bus k and bus m, wherein the first transmission line constraint, the second transmission line constraint, and the third transmission line constraint are used to define a boundary of transmission line power flow.

11. A remedial action scheme (RAS) control system, comprising:
   a non-transitory computer-readable memory; and a processor operatively coupled to the non-transitory computer-readable memory, wherein the processor is configured to:
obtain user-entered priorities of loads and generators of the power system;
receive electrical measurements of a power system;
determine active power and reactive power of each bus in the power system based on the received electrical measurements;
real-time calculate one or more optimal remedial actions to maintain maximum load and maximum generators based on the user-entered priorities by optimizing an objective function of load active power, load breaker status, and generator active power;
dynamically determine whether to shed one or more loads, shed one or more generators, runback one or more generators, or any combination thereof, in the power system by using linearized constraints of the power system, wherein the linearized constraints comprise active power flow, reactive power flow, and transmission line constraints; and
send a command to shed the one or more loads, shed the one or more generators, perform runback of the one or more generators, or any combination thereof, to cause the at least one breaker to shed the one or more loads, generators, or both.

12. The RAS control system of claim 11, wherein the processor is configured to perform operations comprising optimizing an objective function based on the active/reactive power of each bus in the power system and the generation of each generator in the power system upon occurrence of one or more electrical system contingencies.

13. The RAS control system of claim 12, wherein the objective function comprises:

$$\text{Max:} \sum_{i=1}^{N_L} W_i * PL_i * \text{Brk\_L}_i + \sum_{j=1}^{N_G} WG_j * PG_j$$

where $N_L$ is the number of loads in the power system, $W_i$ is the weight factor of load i, $PL_i$ is the active power of load i, and $\text{Brk\_L}_i$ is the breaker status of load i, $N_G$ is the number of generators in the system, $WG_j$ is the weight factor of generator j, and $PG_j$ is the active power of generator j.

14. The RAS control system of claim 11, wherein a breaker status variable is used to model the coupling relationship between active and reactive power load, and the discrete characteristics of load shedding.

15. The RAS control system of claim 11, wherein the processor is configured to perform operations comprising generating a set of the transmission line constraints of power flow through transmission lines between buses of the power system, wherein a first transmission line constraint in the set of transmission line constraints is expressed as:

$$-0.866 S_{km}^{max} \leq Q_{km} \leq 0.866 S_{km}^{max}$$

where $S_{km}^{max}$ is the maximum limit of the power allowed for a transmission line between bus k and bus m and $Q_{km}$ is the active power flow through the transmission line between bus k and bus m.

16. The RAS control system of claim 15, wherein a second transmission line constraint and a third transmission line constraint are expressed as:

$$-1.732 S_{km}^{max} \leq 1.732 P_{km} - Q_{km} \leq 1.732 S_{km}^{max}$$

$$-1.732 S_{km}^{max} \leq 1.732 P_{km} + Q_{km} \leq 1.732 S_{km}^{max}$$

where $S_{km}^{max}$ is the maximum limit of the power allowed for the transmission line between bus k and bus m, $P_{km}$ the active power flow through the transmission line between bus k and bus m, wherein the first transmission line constraint, the second transmission line constraint, and the third transmission line constraint are used to define a boundary of transmission line power flow.

17. A method, comprising:
obtaining, via a remedial action scheme (RAS) control system, priorities of loads and generators in a power system;
receiving, via the RAS control system, electrical measurements of the power system;
determining, via the RAS control system, active power and reactive power of each bus in the power system based on the received electrical measurements;
calculating, in real-time during a contingency of the power system, one or more optimal remedial action to maintain maximum load and maximum generators according to the priorities; and
dynamically determining, via the RAS control system, whether to shed one or more loads, shed one or more generators, perform runback on one or more generators, or any combination thereof, by
optimizing an objective function based on the active power of each bus in the power system and the generation of each generator in the power system,
the objective function comprising a function of load active power, load breaker status, and generator active power; and
using linearized constraints comprising active power flow, reactive power flow, and transmission line constraints; and
sending, via the RAS control system, a command to shed the one or more loads, shed the one or more generators, perform runback on the one or more generators, or any combination thereof.

18. The method of claim 17, comprising determining the one or more optimal remedial actions for electrical delivery system using equality and inequality constraints of the power system to allow the RAS control system to dynamically determine load shedding or generation shedding within a cycle upon occurrence of one or more electrical system contingencies.

19. The method of claim 17, wherein the objective function comprises:

$$\text{Max:} \sum_{i=1}^{N_L} W_i * PL_i * \text{Brk\_L}_i + \sum_{j=1}^{N_G} WG_j * PG_j$$

where $N_L$ is the number of loads in the power system, $W_i$ is the weight factor of load i, $PL_i$ is the active power of load i, and $\text{Brk\_L}_i$ is the breaker status of load i, $N_G$ is the number of generators in the system, $WG_j$ is the weight factor of generator j, and $PG_j$ is the active power of generator j.

20. The method of claim 17, comprising using a breaker status variable to model a coupling relationship between active and reactive power load and discrete characteristics of load shedding.

21. The method of claim 17, comprising generating a set of transmission line constraints of power flow through transmission lines between buses of the power system, wherein a first transmission line constraint is expressed as:

$$-aS_{km}^{max} \leq bP_{km}+cQ_{km} \leq aS_{km}^{max}$$

where $S_{km}^{max}$ is the maximum limit of the power allowed for transmission line between bus k and bus m, and $P_{km}$ and $Q_{km}$ are the active and reactive power flow through the transmission line between bus k and bus m, and a, b, and c are user selected constants.

* * * * *